Patented June 18, 1946

2,402,384

UNITED STATES PATENT OFFICE 2,402,384

ION EXCHANGE POLYAMINE RESINS AND METHOD OF PREPARING SAME

John W. Eastes, Bel Air, Md., assignor to The Resinous Products & Chemical Company, Philadelphia, Pa., a corporation of Delaware No Drawing. Application April 25, 1944, Serial No. 532,656

20 Claims. (Cl. 260—45)

This invention relates to nitrogenous resinous compositions which are particularly useful for the absorption of acid-forming materials from fluids. These compositions are characterized by their favorable capacity for absorbing relatively large amounts of such acid-forming materials and for doing so efficiently upon regeneration and repeated use.

The present application is a continuation-in-part of my application Serial No. 387,688, filed April 9, 1941.

The properties of a resin having capacity for absorption of acid-forming materials should be such that along with high capacity and good basicity there are physical properties which contribute to efficiency, freedom from contamination of the treated liquid or gas, ease of regeneration and washing, and long life on repeated use. A combination of such properties has been lacking in the materials heretofore proposed for the absorption of acidic components in fluids.

More particularly, this invention deals with nitrogenous resins which are formed by the condensation of a phenol, formaldehyde, and an alkylene polyamine, the alkylene group of which may be interrupted by —NH— to form alkylene chains of at least two carbon atoms between nitrogen atoms. These resins prepared by the procedure hereinafter set forth possess the properties which have been recited above as requisite for an "anion exchange" material and which have been lacking in materials heretofore available.

Although condensates of various phenols, formaldehydes, and simple primary or secondary non-aromatic amines have heretofore been reported, these condensates have in general been soluble materials. Some condensates heretofore proposed, though insoluble in water, are soluble in dilute acids and in alkali hydroxide solutions. Obviously, these condensates do not meet the requirements for an anion exchange material. While it is known that many resinous condensates become relatively insoluble when heated, mere heating of the condensates heretofore known does not produce a material having the balance of properties requisite for the type of resin here contemplated as particularly useful for the absorption of acidic constituents.

It has now been found that resinous compositions having a suitable combination of properties for the efficient removal or replacement of acidic constituents from fluids, including both liquids containing ionizable substances and gases containing acid-forming constituents, are prepared by reacting in aqueous solution a methylol-forming phenol, an alkylene polyamine, and formaldehyde in an amount at least molecularly equivalent to both phenol and amine to give a gel, and heating the gel under drying conditions, for instance, in an oven provided with vents, at a temperature above about 75° C. but below the temperature at which "scorching" of the resulting resin would take place, that is, the temperature at which incipient decomposition occurs, resulting in loss of amino groups. The upper limit of temperature to which the condensate may be heated varies with the particular phenol and polyamine used and their proportions, but, generally speaking, such upper limit is within the range of 135° to 150° C. The preferred range of temperature at which the condensate may be heated under drying conditions is 105° C. to 130° C. In any event, heating of the gel under drying conditions is carried on at the chosen temperature for a period of time sufficient to render the resulting resin insoluble in dilute strong acids, e. g., 5 to 10% sulfuric acid. Time of heating will vary inversely with the temperature at which the heating is conducted. Within the preferred temperature range, the resin usually becomes insoluble in dilute strong acids within a period of from about thirty-six to about twelve hours.

Phenols which are useful in forming these resins include a wide variety of aromatic compounds having one or more nuclear hydroxyl groups from both the monocyclic and polycyclic series. These phenols may contain alkyl, cycloalkyl, aralkyl, aryl, alkoxy, aryloxy, hydroxyalkyl, nitro, halogeno, acyl, or other such substituents. Typical phenols are phenol itself, the cresols, the naphthols, phenyl phenol, benzyl phenol, cyclohexyl phenol, tert.-butyl phenol, amyl phenol, octyl phenol, resorcinol, hydroquinone, catechol, guaiacol, natural tanning materials of the catechol type, etc. These phenols all possess the common feature that they have available for substitution hydrogen in the positions ortho and/or para to the phenolic hydroxyl group. They are commonly known as "methylol-forming phenols." It is desirable that the methylol-forming phenol possess at least two, and preferably three, nuclear positions ortho or para to the phenolic hydroxyl group available for direct substitution per molecule.

The polyamines which are useful are the alkylene polyamines such as ethylene diamine, diethylene triamine, triethylene tetramine, tetraethylene pentamine, N,N'-bis(aminopropyl)ethylene diamine, dipropylene triamine, tris(trimethylene) tetramine, and other polalkylene polyamines.

The formaldehyde may be used as an aqueous or organic solvent solution, as a gas, or as a solid polymer. Part of the formaldehyde may be supplied by compounds which yield methylene groups, such as hexamethylene tetramine.

The total mols of formaldehyde to be used are, as a rule, at least equal to the combined mols of the phenol and the polyamine. It is preferred that the total mols of formaldehyde used be at least equal to the total mols of polyamine plus 1.2 times the total mols of phenol. The amount of formaldehyde used, however, may be greater than the minima above stated. Beyond those amounts of formaldehyde which combine with the phenol and the polyamine, excess formaldehyde will be driven off in the heating operation. The total amount of formaldehyde will depend not only upon the amounts of the other reactants but also upon the order of mixing the reactants and the conditions of the reaction. In general, sufficient formaldehyde should be added to ensure insolubility of the resins in dilute strong acids, such as hydrochloric or sulfuric.

The proportions of the other reactants may also be widely varied. It has been found that the capacity for absorption of acidic constituents increases with increasing proportions of amine, while hardness increases with increasing proportions of a phenol. Hardness is particularly important when the temperature of fluids being treated is above that of room temperature. It is, therefore, desirable to hold the proportion of polyamine to phenol between four to one and one to four. A particularly suitable ratio of polyamine to phenol is within the range of 2 to 1 mols of polyamine to 1 to 2 mols of phenol. A preferred ratio is one mol of polyamine per mol of phenol.

The three components of the reaction mixture may be combined in any desired order to give resins having good capacity for the absorption of acid-forming materials. The most effective methods of mixing are, however, to combine formaldehyde and a mixture of phenol and amine or to combine amine with a mixture of phenol and formaldehyde. If formaldehyde and amine are mixed before the addition of a phenol, it is generally necessary to use an additional amount of formaldehyde and control of the reaction is less certain. A large excess of formaldehyde, however, can be avoided by supplying formaldehyde in two stages of the reaction. An important consideration is to effect reaction of all three components and to effect this reaction in such a way that a hydrophilic gel is formed. This is accomplished by conducting the reaction in a solution containing water, other solvents such as alcohol being permissible in conjunction therewith, mixing the reactants slowly and thoroughly and preventing overheating of the mixture so that insoluble curds do not separate. The rate of mixing, the temperatures of the various stages, and other precautions which are necessary to produce a gelatinous product vary somewhat from phenol to phenol, but should offer no difficulty in the light of what is said above.

Particularly desirable gel formation is ensured when the reaction mixture contains a strong hydroxide, such as sodium hydroxide, potassium hydroxide, or trimethyl benzyl ammonium hydroxide. This may be added before or during the condensation. Employment of a strong hydroxide is of substantial benefit when the phenol used is such that it does not readily dissolve in an aqueous solution of the polyamine. Amounts of strong hydroxide up to a full mol per mol of phenol have been found useful. However, the proportion of hydroxide to phenol may be widely varied. Proportions less than mol per mol have been found to act cyclically in making available for condensation even the phenols of low solubility.

After its formation, the hardened resin is rendered particularly suitable for the absorption of acidic constituents from fluids by crushing the hardened mass into particle form and screening to suitable mesh. Particle sizes of from 10 to 50 mesh have been found particularly desirable for utilization in columns, for instance. However, larger and smaller particle sizes may be required for other applications to which the resin is adapted.

The products which are obtained by the procedure here described are resins of the phenol-formaldehyde type which are chemically or structurally characterized by the presence of aminoalkylene aminomethyl substituents on the phenyl nuclei. The alkylene chains of these substituents may be interrupted by —NH— groups to form alkylene chains of at least two carbon atoms each between nitrogen atoms, thus forming polyalkylene polyamine groups attached to phenyl nuclei through methylene groups. When polyethylene polyamines are used in the reaction, the resulting products contain polyethylene polyamine groups such as tetraethylene pentamine, triethylene tetramine, or diethylene triamine groups.

The following examples give more details regarding the preparation of typical resinous compositions.

*Example 1*

A mixture was made by adding 47 parts of phenol to 216 parts (by weight) of aqueous 37% formaldehyde held at 29° C. by cooling. This mixture was slowly added to 73 parts of triethylene tetramine, causing an immediate and vigorous reaction resulting in an increase of temperature to almost 100° C. and the formation of a gel, which was maintained at about 95° C. for an hour. The gel was then heated for twenty-four hours in an oven at 130° C., yielding 141 parts of a very hard resin. After it had been crushed to a 20/40 mesh size, washed with a 5% sodium carbonate solution and with water, and dried, it was tested for capacity with an aqueous solution containing 400 parts per million of sulfuric acid. It had a capacity of 279 milligrams per gram and gave an excellent quality of performance, giving no color to the liquid treated, allowing free flow in columns, and permitting regeneration, washing and re-use at high efficiency.

*Example 2*

Two hundred forty parts of aqueous 37% formaldehyde was combined with a mixture of 46 parts of phenol and 95 parts of tetraethylene pentamine. Although a gel formed at once, the reaction mixture was heated on a steam bath for several hours, dried in an oven at about 130° C., crushed to 20/40 mesh size, washed with a 3% ammonia solution, and with water, and dried at low temperature with air circulation. This resin is also of high capacity and gives an excellent performance on repeated use.

Example 3

A mixture of 58.5 parts of phenol and 243 parts of aqueous 37% formaldehyde was added to 73 parts of triethylene tetramine. The gel which formed was heated for an hour on a steam bath, dried at 115° C., washed with dilute sodium hydroxide solution, and then with water, and dried at 30°–40° C. The resin thus prepared has a capacity of 253 milligrams of sulfuric acid per gram of resin.

Example 4

Fifty-seven parts of dihydroxyphenyl dimethyl methane was stirred into 150 parts of water to which eight parts of sodium hydroxide was added. After most of the dihydroxyphenyl dimethyl methane had dissolved, 60 parts of aqueous 37% formaldehyde was added. The mixture was stirred for about two hours with the temperature thereof held at about 50° C. to give a clear solution. This was cooled to room temperature and there was then added 140 parts of tetraethylene pentamine while the reaction mixture was cooled to dissipate heat from the exothermic reaction. When this subsided, 102 parts of 37% formaldehyde was added and the temperature maintained at 75°–80° C. for several hours. There resulted a gel which was removed from the reaction vessel, dried at 115° C. for sixteen hours, crushed to 20/40 mesh particles, washed with a 5% sodium carbonate solution and with water, and air-dried. The resin is characterized by hardness, physical strength, and high capacity for anion exchange.

Example 5

Ninety parts of quebracho tannin and five parts of phenol were dissolved in 200 parts of water at 95° C. and 73 parts of triethylene tetramine added thereto. The resulting solution was cooled to 40° C., whereupon 162 parts of aqueous 37% formaldehyde was added. An exothermic reaction took place, causing a rise in temperature to 60° C. A gel soon formed. After the reaction mixture had been heated on a steam bath for two hours, the gel was removed from the reaction vessel, dried at 130° C. for sixteen hours, crushed, screened to a 20/40 mesh product, washed with a 5% sodium carbonate solution and with water, and air-dried. The resin has favorable physical properties and good capacity for anion exchange.

In the formation of these resins suitable for absorbing acid-forming materials, it is sometimes desirable, as has been indicated above, to carry out the reaction in the presence of an alkali, such as sodium hydroxide or potassium hydroxide. In other cases, the presence of an acid catalyzes the formation of a resin with the optimum balance of properties for anion exchange or for absorption of acidic materials. The acid anions are removable from the hardened resin by treatment with a solution of an alkaline agent, such as soda ash, ammonia, sodium hydroxide, etc. If desired, the resinous gel may be formed in the presence of a filler or carrier, such as silica, alumina, starch, alpha floc, or the like, or inert fillers may be mixed with the gel or with the resin.

By reaction of alkylene polyamine, a phenol, and formaldehyde to form a gel-like condensate which is thereafter hardened under drying conditions at temperatures and times above set forth to form an insoluble resin, there are obtained compositions having high capacity for anions and suitable properties for use in large scale apparatus under repeated use. Such properties permit packing in columns, regeneration and washing, and good flow.

I claim:

1. An anion exchange resin obtained by reacting in an aqueous medium, until a hydrophilic gel is formed, a methylol-forming phenol, an alkylene polyamine, and formaldehyde, in the proportions of one-fourth to four mols of polyamine per mol of phenol and of mols of formaldehyde at least equivalent to the total mols of phenol and polyamine, and thereafter heating said gel under drying conditions until a nitrogenous resin insoluble in dilute strong acids is formed, said heating being conducted at a temperature above about 75° C. and below the scorching temperature of the resulting resin, whereby there results a resin characterized by substantial hardness, high physical strength, good absorption capacity, and exceptional stability during use and regeneration.

2. An anion exchange resin obtained by reacting in an aqueous medium, until a hydrophilic gel is formed, a methylol-forming phenol, an alkylene polyamine, and formaldehyde, in the proportions of one-fourth to four mols of polyamine per mol of phenol and of mols of formaldehyde at least equivalent to the total mols of phenol and polyamine, thereafter heating said gel under drying conditions until a nitrogenous resin insoluble in dilute strong acids is formed, said heating being conducted at a temperature above about 75° C. and below the scorching temperature of the resulting resin, and then breaking the resin into relatively small particles, whereby there results a resin characterized by substantial hardness, high physical strength, good absorption capacity, and exceptional stability during use and regeneration.

3. An anion exchange resin obtained by reacting in an aqueous medium and in the presence of a strong alkaline hydroxide, until a hydrophilic gel is formed, a methylol-forming phenol, an alkylene polyamine, and formaldehyde, in the proportions of one-fourth to four mols of polyamine per mol of phenol and of mols of formaldehyde at least equivalent to the total mols of phenol and polyamine, thereafter heating said gel under drying conditions until a nitrogenous resin insoluble in dilute strong acids is formed, said heating being conducted at a temperature above about 75° C. and below the scorching temperature of the resulting resin, and then breaking the resin into relatively small particles, whereby there results a resin characterized by substantial hardness, high physical strength, good absorption capacity, and exceptional stability during use and regeneration.

4. An anion exchange resin obtained by reacting in an aqueous medium, until a hydrophilic gel is formed, a methylol-forming phenol, a polyalkylene polyamine, and formaldehyde, in the proportions of one-half to two mols of polyamine per mol of phenol and of mols of formaldehyde at least equivalent to the mols of polyamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

5. An anion exchange resin obtained by reacting in an aqueous medium, until a hydrophilic gel is formed, a methylol-forming phenol, a polyalkylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles, whereby there results a resin characterized by substantial hardness, high physical strength, good absorption capacity, and exceptional stability during use and regeneration.

6. An anion exchange resin obtained by reacting in an aqueous medium and in the presence of a strong alkaline hydroxide, until a hydrophilic gel is formed, a methylol-forming phenol, a polyalkylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles, whereby there results a resin characterized by substantial hardness, high physical strength, good absorption capacity, and exceptional stability during use and regeneration.

7. An anion exchange material obtained by reacting in an aqueous medium until a hydrophilic gel is formed a phenol having at least two nuclear hydrogen atoms per molecule in reactive positions available for direct substitution, a polyalkylene polyamine, and formaldehyde, in the proportions of one-half to two mols of polyamine per mol of phenol and of mols of formaldehyde at least equivalent to the mols of polyamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

8. An anion exchange resin obtained by reacting in an aqueous medium, until a hydrophilic gel is formed, a methylol-forming phenol, a polyethylene polyamine, and formaldehyde, in the proportions of one-half to two mols of polyamine per mol of phenol and of mols of formaldehyde at least equivalent to the mols of polyamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

9. An anion exchange resin obtained by reacting in an aqueous medium, until a hydrophilic gel is formed, a methylol-forming phenol, tetraethylene pentamine, and formaldehyde, in the proportions of one-half to two mols of pentamine per mol of phenol and of mols of formaldehyde at least equivalent to the mols of pentamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

10. An anion exchange resin obtained by reacting in an aqueous medium, until a hydrophilic gel is formed, a methylol-forming phenol, triethylene tetramine, and formaldehyde, in the proportions of one-half to two mols of tetramine per mol of phenol and of mols of formaldehyde at least equivalent to the mols of tetramine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

11. An anion exchange resin obtained by reacting in an aqueous medium, until a hydrophilic gel is formed, a methylol-forming phenol, diethylene triamine, and formaldehyde, in the proportions of one-half to two mols of triamine per mol of phenol and of mols of formaldehyde at least equivalent to the mols of triamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

12. An anion exchange material obtained by reacting in an aqueous medium until a hydrophilic gel is formed a phenol having at least two nuclear hydrogen atoms per molecule in reactive positions available for direct substitution, a polyethylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles, whereby there results a resin characterized by substantial hardness, high physical strength, good absorption capacity, and exceptional stability during use and regeneration.

13. An anion exchange resin obtained by reacting in an aqueous medium, until a hydrophilic gel is formed, phenol, a polyalkylene polyamine, and formaldehyde, in the proportions of one-half to two mols of polyamine per mol of phenol and of mols of formaldehyde at least equivalent to the mols of polyamine plus 1.2 times the mols of phenol, and thereafter heating said gel under drying conditions until a nitrogenous resin insoluble in dilute strong acids is formed, said heating being conducted at a temperature within the range of about 105° C. to about 130° C., whereby there results a resin characterized by substantial hardness, high physical strength, good absorption capacity, and exceptional stability during use and regeneration.

14. A method for preparing insoluble nitrogenous resinous compositions suitable for absorbing acidic constituents from fluids which comprises reacting in an aqueous medium, until a hydrophilic gel is formed, a methylol-forming phenol, an alkylene polyamine, and formaldehyde, in the proportions of one-fourth to four mols of polyamine per mol of phenol and of mols of formaldehyde at least equivalent to the total mols of phenol and polyamine, and thereafter heating said gel under drying conditions until a nitrogenous resin insoluble in dilute strong acids is formed, said heating being conducted at a temperature above about 75° C. and below the scorching temperature of the resulting resin, whereby there results a resin characterized by substantial hardness, high physical strength, good absorption capacity, and exceptional stability during use and regeneration.

15. A method for preparing insoluble nitrogenous resinous compositions suitable for absorbing acidic constituents from fluids which comprises reacting in an aqueous medium, until a hydrophilic gel is formed, a methylol-forming phenol, a polyalkylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles, whereby there results a resin characterized by substantial hardness, high physical strength, good absorption capacity, and exceptional stability during use and regeneration.

16. A method for preparing insoluble nitrogenous resinous compositions suitable for absorbing acidic constituents from fluids which comprises reacting in an aqueous medium, until a hydrophilic gel is formed, a phenol having at least two nuclear hydrogen atoms per molecule in reactive positions available for direct substitution, a polyalkylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles, whereby there results a resin characterized by substantial hardness, high physical strength, good absorption capacity, and exceptional stability during use and regeneration.

17. A method for preparing insoluble nitrogenous resinous compositions suitable for absorbing acidic constituents from fluids which comprises reacting in an aqueous medium and in the presence of a strong alkaline hydroxide, until a hydrophilic gel is formed, a methylol-forming phenol, a polyethylene polyamine, and formaldehyde, in the proportions of one-half to two mols of polyamine per mol of phenol and of mols of formaldehyde at least equivalent to the mols of polyamine plus 1.2 times the mols of phenol, thereafter heating said gel under drying conditions until a nitrogenous resin insoluble in dilute strong acids is formed, said heating being conducted at a temperature within the range of about 105° C. to about 130° C., and then breaking the resin into relatively small particles.

18. A method for preparing insoluble nitrogenous resinous compositions suitable for absorbing acidic constituents from fluids which comprises reacting in an aqueous medium, until a non-resinous, soluble methylol compound is formed, a methylol-forming phenol and formaldehyde, reacting therewith, until a hydrophilic gel is formed, an alkylene polyamine and more formaldehyde, the proportions of polyamine and phenol used being within the range of one-fourth to four mols of the former per mol of the latter, the total mols of formaldehyde used being at least equivalent to the mols of both phenol and polyamine, and thereafter heating said gel under drying conditions until a nitrogenous resin insoluble in dilute strong acids is formed, said heating being conducted at a temperature above about 75° C. and below the scorching temperature of the resulting resin, whereby there results a resin characterized by substantial hardness, high physical strength, good absorption capacity, and exceptional stability during use and regeneration.

19. A method for preparing insoluble nitrogenous resinous compositions suitable for absorbing acidic constituents from fluids which comprises reacting in an aqueous medium and in the presence of a strong alkaline hydroxide, until a non-resinous, soluble methylol compound is formed, a methylol-forming phenol and formaldehyde, reacting therewith, until a hydrophilic gel is formed, an alkylene polyamine and more formaldehyde, the proportions of polyamine to phenol used being within the range of one-half to two mols of the former per mol of the latter, the total mols of formaldehyde used being at least equivalent to the mols of polyamine plus 1.2 times the mols of phenol, thereafter heating said gel within the temperature range of about 105° C. to about 130° C. under drying conditions until a nitrogenous resin insoluble in dilute strong acids is formed, and then breaking the resin into relatively small particles.

20. A method for preparing insoluble nitrogenous resinous compositions suitable for absorbing acidic constituents from fluids which comprises reacting in an aqueous medium and in the presence of a strong alkaline hydroxide, until a non-resinous, soluble methylol compound is formed, phenol and formaldehyde, reacting therewith, until a hydrophilic gel is formed, an alkylene polyamine and more formaldehyde, the proportions of polyamine to phenol used being within the range of one-half to two mols of the former per mol of the latter, the total mols of formaldehyde used being at least equivalent to the mols of polyamine plus 1.2 times the mols of phenol, thereafter heating said gel within the temperature range of about 105° C. to about 130° C. under drying conditions until a nitrogenous resin insoluble in dilute strong acids is formed, and then breaking the resin into relatively small particles.

JOHN W. EASTES.